W. S. BREWER.
Drag-Saw.
No. 216,374. Patented June 10, 1879.
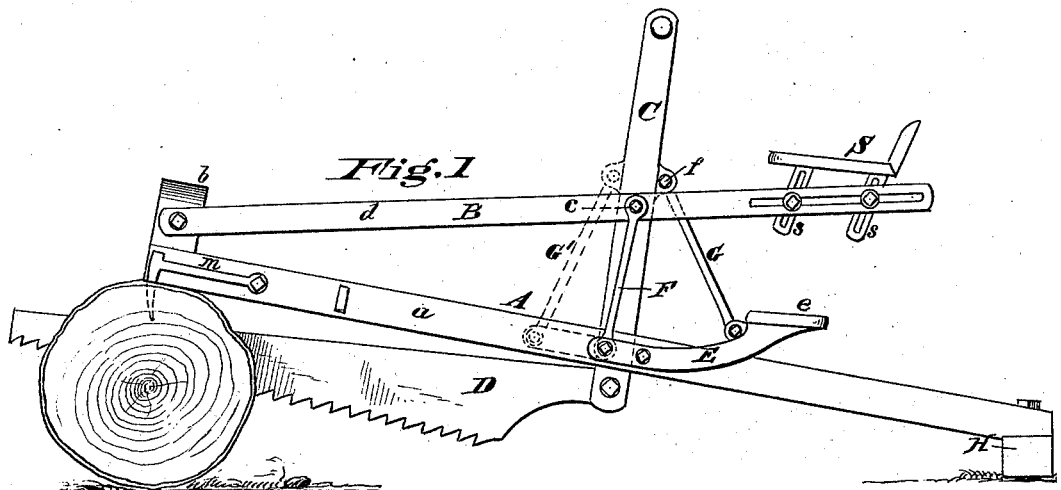
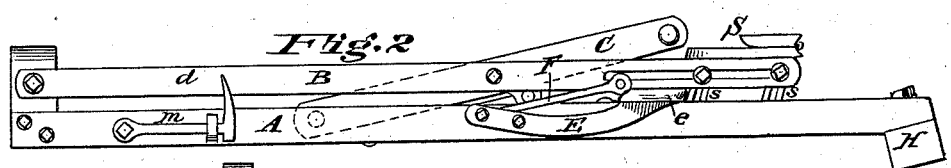
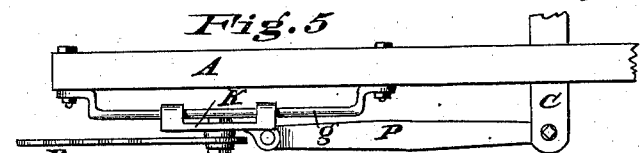
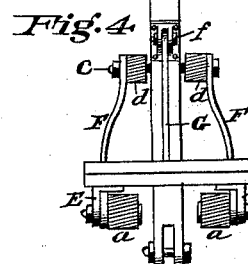
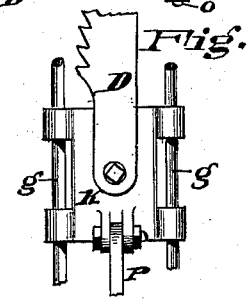
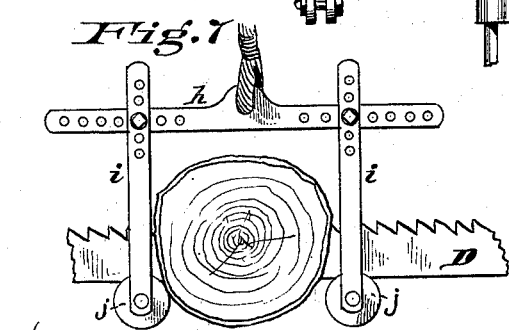
Inventor
Wesley S. Brewer
by L. M. Hosea
Attorney
Attest
Edgar Gross
Caw. Gurney.

UNITED STATES PATENT OFFICE

WESLEY S. BREWER, OF RICHMOND, INDIANA.

IMPROVEMENT IN DRAG-SAWS.

Specification forming part of Letters Patent No. 216,374, dated June 10, 1879; application filed March 21, 1879.

*To all whom it may concern:*

Be it known that I, WESLEY S. BREWER, of Richmond, Wayne county, Indiana, have invented a new and useful Improvement in Drag-Saws or Sawing-Machines, of which the following is a full, clear, and exact description, reference being had to the accompanying drawings and the letters of reference made thereon.

My invention relates to that class of sawing-machines designed to be operated by human power, and its object is to increase their efficiency, improve and simplify their construction, cheapen their cost, and adapt them to certain other special uses to which they may, with great advantage, be applied.

To this end my invention consists, first, in the combination of the following instrumentalities, namely: a base-frame, a vertically-vibrating seat-lever pivoted thereto, a vertical hand-lever pivoted to the seat-lever and carrying the saw below, one or more foot-levers pivoted directly to the base-frame, and having pitman or rod connection with the hand-lever and seat-lever, so arranged that the depression of the said foot-levers operates to thrust the saw forward and elevate the seat-lever, and the depression of the seat-lever operates to elevate the foot-levers and draw the saw backward; second, in the combination, as hereinafter specified, of the said foot-levers, band or saw lever, and seat-lever, by connecting-rods, as represented and described; third, in the combination, with the seat-lever, of a seat mounted thereon, and having both a vertical and horizontal adjustment thereon by mechanism substantially as hereinafter described; fourth, in the combination of a vertically-pivoted hand or saw lever, a seat or weight lever, one or more foot-levers, and a cross-head moving on horizontal guides to actuate a horizontal saw and connected with the actuating-levers by rod or pitman; fifth, in the combination, with a horizontal saw for felling timber, of an adjustable frame composed of a cross-bar, slotted arms through which the saw moves and is thereby guided, and sheaves riding on the back of the saw for holding it to its work; sixth, in the combination, with the said frame for guiding the saw and holding it to its work, of a cord or equivalent means of connecting the said frame with a weight or spring, for imparting a suitable pressure to the saw.

In the drawings herewith, Figure 1 represents a side elevation of the machine embodying certain of my improvements; Fig. 2, a side elevation of the same as folded up for transportation; Fig. 3, a sectional end view, showing the U-brace connecting the bars of the frame and seat-lever at the front end. Fig. 4 is a vertical sectional elevation through the foot-board in rear of the saw-lever. Fig. 5 is a side elevation of the cross-head, guides, and pitman used in sawing a horizontal kerf. Fig. 6 is a plan or bottom view of the same. Fig. 7 is a plan view of the saw-holding device used in sawing standing timber.

A is the supporting-frame of the machine, consisting of two parallel bars, *a*, united in front by an inverted U-brace, *b*, of any convenient height to permit the saw to rise between the bars *a*, and at the rear by a crossbar, H, giving the frame a laterally-supporting base.

B is a seat-lever, which may consist either of a flat board suitably slotted, or of two parallel bars, *d d*, the latter being on some accounts preferred. The lever B is pivoted at its forward end to the exterior of the curved brace *b*, and extends backward at a suitable angle above the supporting-frame A, with a seat at the rear for the operator.

C is a lever pivoted vertically at *c*, between the bars *d d* composing the lever B, and extending downward between the bars *a a* of the supporting-frame, provided at its lower end with a slot and pivot for carrying the saw or pitman. At the upper end of the lever C are lateral handles for convenience of operation by the operator seated upon the lever B. Horizontal levers E E are pivoted to the outside of the supporting-frame, or to pillow-blocks upon the bars *a*, and are curved upward at their rear ends, and connected by a foot-board, *e*, extending across the supporting-frame sufficiently above it to allow the necessary vertical motion.

The forward ends of the foot-levers E are connected by pitman F with the pivot *c* of the working-lever C, or the pitman F may be pivoted directly to the lever B. The foot-board is connected by a pitman, G, with the working-lever C at a pivot, f, a little above and in rear of its working pivot c. Instead of the last-mentioned connection, the levers E may be extended forward and connected by a bifurcated pitman, G', connecting the forward ends of the levers E with the working-lever C at a point relatively in front of its working-pivot c, as shown by dotted lines in Fig. 1; but I prefer the first-mentioned arrangement. Dogs m are pivoted to the sides of the frame A to hold the machine in position when at work.

S is a seat provided for the operator at the rear end of lever B, and will be more particularly described hereinafter.

The operation of the machine is as follows: The machine being placed in position, with its forward end on the log to be sawed and the rear end upon the ground, the dogs m are driven into the log, and the operator takes the seat S, with his foot resting lightly upon the foot-brace e, and grasps the handles of the lever C, at the same time pushing them forward. His weight at the same time bearing downward through lever B upon the pivot c, acts, through the pitman F F, to depress the forward ends of the foot-levers E and elevate the foot-board e at their rear ends, thus exerting a force by means of the pitman G upon the working-lever C at f, to draw forward the upper end of the lever C and draw back the lower end and saw into position for its forward stroke.

The operator then transfers his weight to his feet, by which he obtains a support and fulcrum for the leverage of his body and arms in drawing back the handles of lever C. His weight also acting upon the foot-board e depresses the rear and elevates the front ends of the foot-levers E, thus drawing back the upper end of lever C by means of pitman G, and at the same time elevating the lever B by means of pitmen F. Thus the lower end of lever C and the saw are thrust forward, while the lever B and other parts are returned to position for a repetition of the first movement. The alternation of these movements produces the desired travel of the saw to and fro in the kerf. The weight of the operator being directly applied to the lever C through the medium of the levers attached to the seat and foot-rests in addition to his muscular force, the reciprocating motion of the lever is exceedingly powerful, and may be applied to many useful purposes, such as driving hand-cars on railroads and other vehicles, propelling boats, or in driving light machinery, such as straw-cutters, &c., or, indeed, to many useful purposes in which machinery has not heretofore been applied; and a double machine embodying the same principles of operation, in which the weight and muscular power of a number of persons may be applied to the operation of the same lever, may be constructed to operate fire-engines, plantation machinery, bilge-pumps, &c.

When the machine is out of use, or it is desired to transport it from place to place, the saw may be removed, the connecting-rods F detached at their upper ends from the pivot c, and the connecting-rod G also detached from one of its pivots. This allows the lever B to drop down upon the supporting-frame and all the parts to be secured in a compact and convenient shape for transportion.

The outer ends of the supporting-brace H may be furnished with spindles and wheels attached thereto, and the forward end of the frame provided with handles or a swiveling truck-wheel, which will materially aid in moving the machine from place to place.

It is desirable, in machines of this class, that in order to adapt it to persons more or less elongated as to their extremities, means should be provided to increase or diminish the distance between the seat S and the handles of lever C and between the seat S and foot-board e. This I accomplish by making the seat adjustable both vertically and longitudinally in relation to lever B.

The mode of adjustment shown in the drawings consists in providing the seat S with one or two vertical braces, s, extending below and passing between the bars d, each brace being provided with a slot of sufficient length to give the necessary vertical movement, and providing also a lateral longitudinal slot in the bars d. The vertical braces s being inserted downward between the bars d, bolts are inserted through the slots of the bars d, and braces s, and the parts firmly secured in the desired position by set-screws, which may be changed in the same manner at will.

In order to adapt the machine to cut horizontally, as in the case of standing timber, props of mines, &c., I provide devices for that purpose which may be attached to the machine with ease and celerity. Those shown in the drawings consist of two parallel guides, g, which may be attached at their ends by bolts to the under side of the bars a, near their front ends, and a cross-head, K, operated upon the guides from the lever C by a pitman, P, and carrying a pivot or wrist, o, projecting vertically downward, and provided with a screw thread and bolt at its end. The saw being pivoted upon the wrist o, a free lateral vibration is afforded while it is being reciprocated in the kerf. It is necessary, however, that means should be used for forcing the saw laterally into the kerf when in operation, as well as to guide and sustain it in beginning its cut. To accomplish this result I provide a light frame of iron, (shown in Fig. 7,) consisting of arms i i, adjustably attached to a cross-bar, h, provided with a central perforation for the attachment of a rope. The arms i i may each consist of two flat iron straps, holding between their extreme ends thin sheaves j j. The saw operates laterally between the straps composing the arms i, while the sheaves ride upon the back of the saw.

When in operation the rope is carried outward and secured to a "sapling," or a spring provided for the purpose, and guided by suitable pulleys or other devices, so that the reaction of the spring operates to draw the saw toward the tree in the proper direction for its cut. A weight at the end of the rope may be used for the same purpose.

The cross-bar $h$ is secured by set-screws to the arms $i$, both arms and cross-bar being provided with suitable holes to permit adjustment to the varying sizes of trees to be cut. In securing these parts together the arms $i$ must be left to vibrate freely about the set-screws, and by this means the horizontal vibration of the saw in the kerf is equalized through the medium of the cross-bar, which acts as a single-tree with respect to the draft of the rope.

This machine may be used with great advantage with a crosscut-saw, or one which cuts in both directions. Under some circumstances, however, this is not desirable, and as the saw-blade is preferably of thin metal, the powerful thrust given it is sometimes apt to cause the saw-blade to "buckle" when entering the kerf. I therefore provide a saw-blade, D, of triangular shape, in which the serrated edge is the hypotenuse and the back of the saw the base. As the direction of the thrust is in the line of its general length, the force is therefore applied in a direction toward the cutting-edge, which results in more rapid work, while in withdrawing the saw for another thrust the friction and consequent wear upon the teeth are lessened. Thus I secure all the advantages with none of the disadvantages of weights, which in this way do harm to the saw. The saw, being thus of increased depth at the rear end, is stiffened to resist buckling.

Where a crosscut-saw is used it is desirable to form the cutting-edge to the arc of a circle, so that the saw shall be wider in the middle.

I am aware that foot-levers pivoted to the seat-lever and connected with the hand-lever by links have before been used in this class of sawing-machines, and do not claim such as my invention.

Having described my invention, I claim and desire to secure by Letters Patent—

1. The combination, in a sawing-machine adapted to be operated by human power, of the following instrumentalities, namely: a base-frame, a vertically-vibrating seat-lever pivoted thereto, a vertical hand-lever pivoted to the seat-lever and carrying the saw below, one or more foot-levers pivoted directly to the base-frame, with rods or pitmen connecting the foot-levers with the hand-lever and seat-lever, and so arranged that the depression of the foot-levers operates to thrust the saw forward and elevate the seat-lever, while the depression of the seat-lever operates to draw the saw backward and elevate the foot-levers, substantially as specified.

2. The combination of the foot-levers E, pivoted directly to the base-frame, connecting-rods F G, hand-lever C, and pivoted seat-lever B, substantially as specified.

3. In combination with the seat-lever of a sawing-machine, a seat, S, mounted upon the said lever, and having both a vertical and a horizontal adjustment thereon by mechanism, substantially as specified.

4. In a riding saw-machine, the combination of a vertically-pivoted saw-lever, a weight-lever, a foot-lever, a cross-head moving on horizontal guides to actuate a horizontal saw, and a pitman connecting the cross-head with the said levers, substantially as specified.

5. In combination with a saw for felling standing timber, an adjustable frame consisting of a cross-bar, $h$, slotted arms $i\,i$, through which the saw moves and is thereby guided, and sheaves $j\,j$, riding upon the back of the saw and holding it to its work, substantially as and for the purpose herein specified.

6. In combination with the horizontal saw D, cross-bar $h$, slotted arms $i\,i$, and sheaves $j\,j$, a cord, or its equivalent, to connect the saw and frame with a weight or spring for imparting a pressure to the saw and holding it to its work, substantially as herein specified.

In testimony whereof I have hereunto set my hand this 13th day of March, 1879.

WESLEY S. BREWER.

Witnesses:
L. M. HOSEA,
C. F. HESSER.